(12) United States Patent  (10) Patent No.: US 8,584,011 B2
Teevan et al.  (45) Date of Patent: Nov. 12, 2013

(54) DOCUMENT REPRESENTATION TRANSITIONING

(75) Inventors: Jaime Teevan, Bellevue, WA (US); Susan T. Dumais, Kirkland, WA (US); Daniel J. Liebling, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 426 days.

(21) Appl. No.: 12/820,297

(22) Filed: Jun. 22, 2010

(65) Prior Publication Data

US 2011/0314372 A1 Dec. 22, 2011

(51) Int. Cl.
*G06F 3/00* (2006.01)

(52) U.S. Cl.
USPC ........... 715/255; 715/254; 715/277; 715/838; 707/722; 707/723; 707/728; 707/739

(58) Field of Classification Search
USPC .................................................. 715/255, 277
See application file for complete search history.

(56) References Cited

U.S. PATENT DOCUMENTS

| | | | |
|---|---|---|---|
| 6,353,824 B1 | 3/2002 | Boguraev et al. | |
| 6,883,138 B2 | 4/2005 | Rosenholtz et al. | |
| 7,200,820 B1 * | 4/2007 | Stephens | 715/838 |
| 7,444,598 B2 | 10/2008 | Horvitz et al. | |
| 7,552,398 B2 * | 6/2009 | Bier et al. | 715/800 |
| 7,603,620 B2 | 10/2009 | Erol et al. | |
| 7,693,912 B2 * | 4/2010 | Rose et al. | 707/779 |
| 7,725,837 B2 * | 5/2010 | Wong et al. | 715/815 |
| 7,934,161 B1 * | 4/2011 | Denise | 715/738 |
| 2003/0063094 A1 * | 4/2003 | Smith | 345/581 |
| 2004/0088678 A1 * | 5/2004 | Litoiu et al. | 717/104 |
| 2005/0091591 A1 * | 4/2005 | Boguraev et al. | 715/526 |
| 2006/0085743 A1 * | 4/2006 | Baudisch et al. | 715/526 |
| 2008/0005668 A1 * | 1/2008 | Mavinkurve et al. | 715/526 |
| 2008/0144656 A1 * | 6/2008 | Frishberg et al. | 370/466 |
| 2009/0228777 A1 * | 9/2009 | Henry et al. | 715/230 |
| 2010/0228693 A1 * | 9/2010 | Dawson et al. | 706/12 |
| 2011/0082848 A1 * | 4/2011 | Goldentouch | 707/706 |
| 2012/0078955 A1 * | 3/2012 | Boguraev et al. | 707/769 |
| 2013/0014016 A1 * | 1/2013 | Delgo et al. | 715/723 |

OTHER PUBLICATIONS

Lance Good et al, Automatic Text Reduction for Changing Size Constraints, Apr. 25, 2002, CHI 2002, 798-799.*

(Continued)

*Primary Examiner* — Cesar Paula
*Assistant Examiner* — Mohammed-Ibrahim Zuberi
(74) *Attorney, Agent, or Firm* — Microsoft Corporation

(57) ABSTRACT

One or more techniques and/or systems are provided for transitioning between representations of an electronic document. Elements, such as visual elements, common between a first set of elements from a first representation of the document and a second set of elements from a second representation of the document are identified. The non-intersecting elements from the first and second sets are respectively ranked in accordance with a representation relevance. First set non-intersecting elements are removed from an intermediate representation of the document, and second set non-intersecting elements are added to the intermediate representation, while the intermediate representation is not equivalent to the second representation; and respective iterations of the intermediate representation are output, such as to a display to depict a transition from the first representation of the document to the second representation of the document.

20 Claims, 9 Drawing Sheets

(56) References Cited

OTHER PUBLICATIONS

Dunsmuir "Selective Semantic Zoom of a Document Collection" pp. 1-9 Published Date: Oct. 30, 2009 http://www.cs.ubc.ca/~tmm/courses/533-09/projects/dustin/proposal.pdf.

Teevan; et al., "Visual Snippets: Summarizing Web Pages for Search and Revisitation" pp. 2023-2032 Published Date: Apr. 9, 2009, http://www.dgp.toronto.edu/~bonzo/docs/p2023-teevan.pdf.

Yao "Granular Computing for the Design of Information Retrieval Support Systems" pp. 1-31 Published Date: 2003 http://www2.cs.uregina.ca/~yyao/PAPERS/grc_irss.pdf.

Collins; et al., "DocuBurst: Visualizing Document Content using Language Structure" pp. 1-8 Published Date: 2009 http://faculty.uoit.ca/collins/publications/docs/eurovis2009_docuburst.pdf.

Einsfeld; et al., "Dynamic Visualization and Navigation of Semantic Virtual Environments" pp. 1-6 Published Date: 2008 http://ieeexplore.ieee.org/stamp/stamp.jsp?tp=&arnumber=1648316.

* cited by examiner

420 ⟶

AL'S CYCLE SHOP

WELCOME TO AL'S CYCLE SHOP:

Providing cycling needs world-wide on the web, and locally to the San-Diego-Carlsbad-San Marcos areas of San Diego County.

If there is a cycle, cycle part, or cycling accessory made, Al's either has it in stock, or can get it to the shop or ship it within 48 hours. Search for items, check out our catalogue, or see the deals.

Along with our fully stocked shop in San Diego, we have a full service cycling care center with factory trained technicians taking care of your cycle repairs or mods.

AL'S CYCLE SHOP – Home Page
WELCOME TO AL'S CYCLE SHOP: Providing cycling needs world-wide on the web, and locally to the San-Diego-Carlsbad-San Marcos areas of San Diego County.

If there is a cycle, cycle part, or cycling accessory made, Al's either has it in stock, or can get it to the shop or ship it within 48 hours. Search for items, check out our catalogue, or see the deals.

Along with our fully stocked shop in San Diego, we have a full service cycling care center with factory trained technicians taking care of your cycle repairs or mods.

www. alscycleshop.com

FIG. 4D

DOCUMENT REPRESENTATION TRANSITIONING

BACKGROUND

Electronic documents, such as word processor based documents, spreadsheets, webpages, etc. can be displayed on a computing device's display (e.g., monitor, screen) in a variety of visual representations. Users often interact with different representations of electronic documents, including webpages, emails, and word processing documents. For example, search engines can represent pages resulting from a query as textual snippets (possibly with titles), a query-based page summary, and/or a URL. Similarly, in browsers and other applications, previously viewed webpages can be represented in many ways, including as thumbnails, titles in a user's history, captions within search results, URLs in the address bar, and/or colored hyperlinks, for example, many of which can be interacted with by a user.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Different representations of electronic document have been developed to support different tasks users may wish to perform with the documents. Different representations may be used when a person interacts with a variety of electronic documents, such as when sending/retrieving email, browsing web-based (or local) search results, or finding a document to edit in one's file system, for example. The different visual representations of the documents often contain elements of the full document that assist the user in interacting with the represented document. For example, search results often include the document's title, a query-based short summary, and the document's URL; desktop icons often comprise the document's title and an icon representation of the document type, or a small thumbnail view of the document; and emails may comprise a subject, sender, and sometimes a preview of the message.

While electronic document representations are useful, there are possible drawbacks to current static representations. For example, it is often difficult for a user selecting (e.g., opening) a first representation resulting from a web search, for example, to connect the information presented in the first representation (e.g., snippet, icon with summary, etc.) with the full document. For example, the first representation (e.g., snippet) for a search result may include a sentence of text from the full document, leading the user to conclude the result is relevant. However, when the user opens the document associated with the result, it may be difficult for the user to identify where content related to that sentence is actually located in the document.

Accordingly, one or more techniques and/or systems are disclosed that facilitate orienting the user to a second representation of a document when the user transitions from a first representation of the document. A type of semantic zoom can be implemented between document representations, where a display of the document transitions smoothly between two different representations. The transition can be performed in a way that allows the user to maintain a context developed with the first representation of the document when interacting with the second representation of the document. For example, varying amounts of (relevant) content can be provided between the different representations.

In one embodiment for transitioning between representations of an electronic document, elements in an intersection between a first set of elements from a first representation of the document and a second set of elements from a second representation of the document (e.g., elements common to both sets) are identified. Those elements that are not part of the intersection (e.g., non-intersecting elements that are not common to both sets) are ranked according to representation relevance in both the first and second sets. In one example, intersecting elements may be ranked as well (generally very highly as they are typically displayed). Nevertheless, one or more common elements may be removed or not displayed, for example, to create visually cohesive elements for animation purposes, for example.

While an intermediate representation of the document, which comprises a representation between the first and second representations, is not the same as the second representation of the document the following acts are iterated: non-intersecting elements from the first set are removed from the intermediate representation if they meet a desired removal threshold for representation relevance ranking; further, non-intersecting elements from the second set are added to the intermediate representation if they meet a desired addition threshold for representation relevance ranking; and the intermediate representation of the document is output (e.g., to a display).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIGS. 4A-4D illustrate example embodiments of intermediate representations of a document.

DETAILED DESCRIPTION

Figure 1:
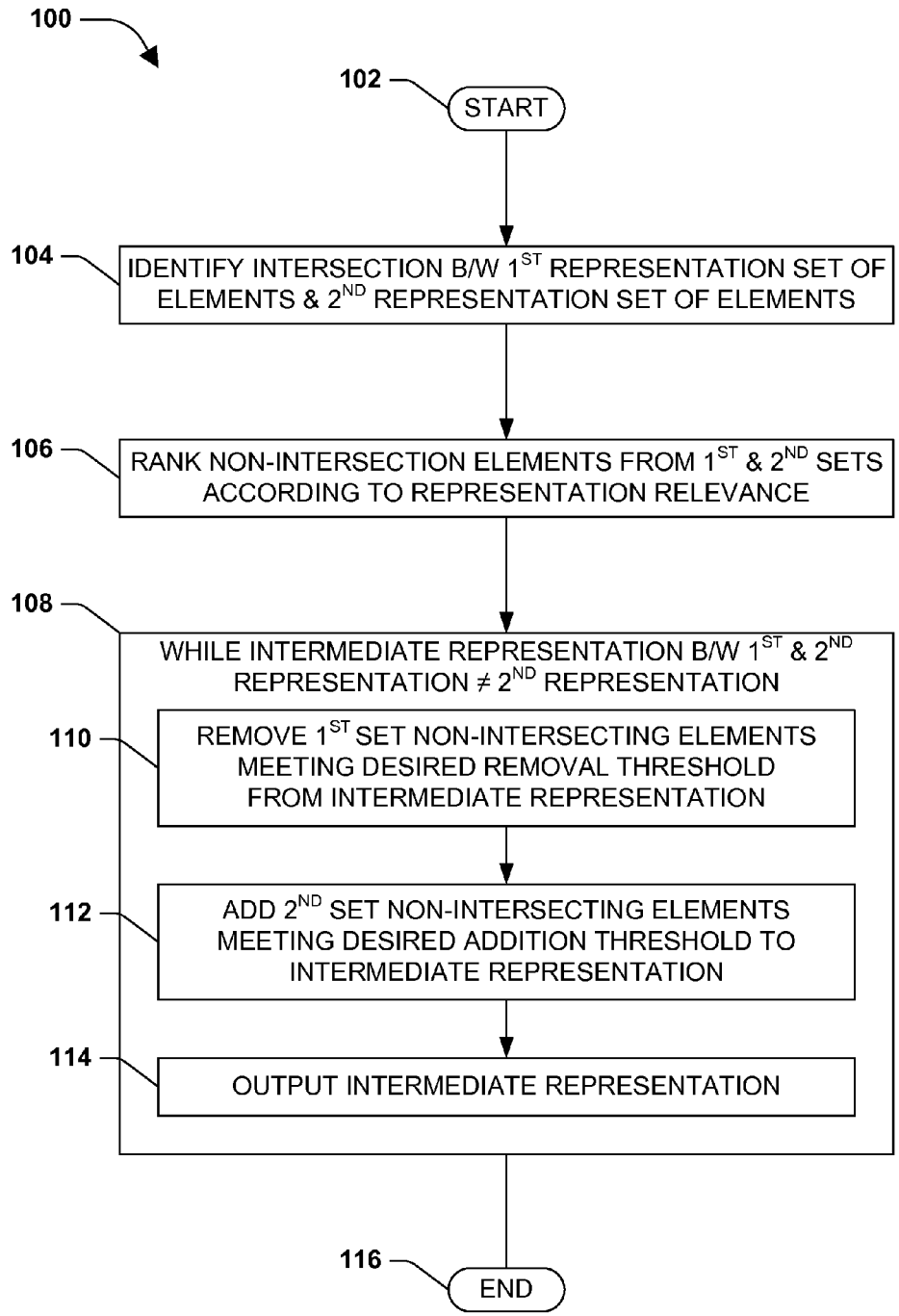
FIG. 1 is a flow diagram of an exemplary method for transitioning between representations of an electronic document.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a flow diagram of an exemplary method 100 for transitioning between representations of an electronic document. The exemplary method 100 begins at 102 and involves identifying an intersection of elements (e.g., elements common to different sets) between a first set of elements from a first representation of the document and a second set of elements from a second representation of the document. For example, a document, such as a webpage, can comprise a plurality of elements that make up the overall representation of the document. In one embodiment, the elements comprise visual elements, for example, which provide a visual representation of the document.

Figure 2:
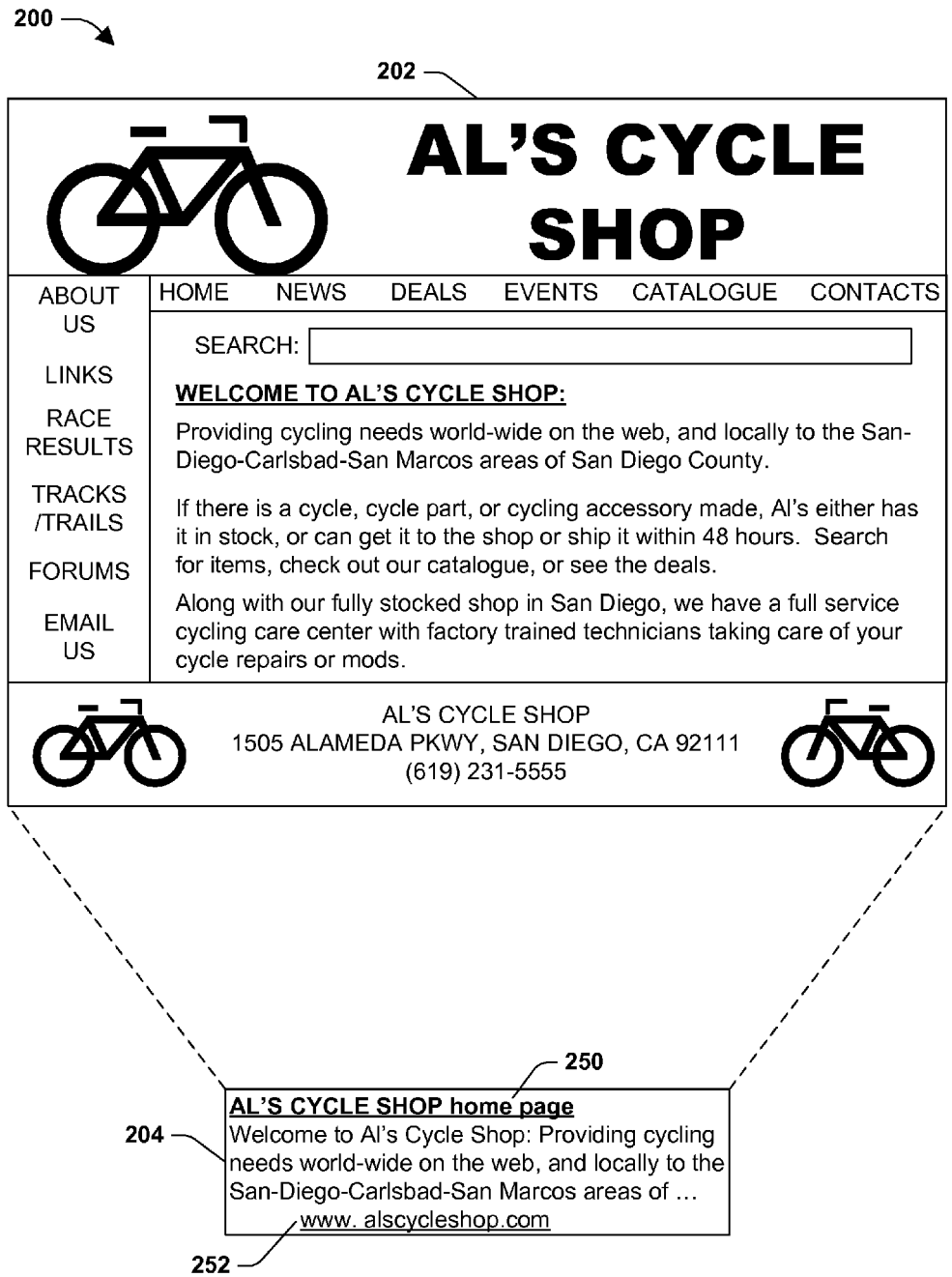
FIG. 2 illustrates one embodiment where one or more techniques described herein may be implemented.

For example, turning briefly to FIG. 2, one embodiment 200 where one or more techniques described herein may be implemented is illustrated. As an example, the first representation of the document may comprise a webpage 202, and the second representation of the document may comprise a snippet 204, such as found in web-based search results (e.g., returned in response to a user entered query). It will be appreciated that, in one embodiment, the first representation may be the snippet 204, and the second representation may be the webpage 202, for example.

In this example embodiment 200, the first representation (webpage 202) and second representation (snippet 204) respectively comprise a set of visual elements that make up the visual representation of the document. The set of elements for first representation of the document may comprise different graphics of cycles, a top headline for "Al's Cycle Shop," a top and a side navigation bar comprising tabs or links that can be "clicked on", a search box, a smaller headline "Welcome To Al's Cycle Shop," a text block, and a contact information block, for example. The set of elements for the second representation (snippet 204) of the document may comprise the top headline "Al's Cycle Shop," some text identifying it as the "home page" 250, the smaller headline "Welcome To Al's Cycle Shop," a(n abbreviated) text block, and a URL 252 for the webpage.

In this example, the intersection of elements between the first set of elements (from the first representation) and the second set of elements (from the second representation of the document) can be identified as: the top headline "Al's Cycle Shop"; the smaller headline "Welcome To Al's Cycle Shop"; and a portion of the text block "Providing cycling needs world-wide on the web, and locally to the San-Diego-Carlsbad-San Marcos areas of". In this example, this set of intersecting elements can comprise the visual elements common to both sets (e.g., common to both representations of the document). It will be appreciated that intersecting elements can be identified even if they are not identical between representations. For example, there are three instances of "Al's Cycle Shop" in 202 and two instances of "Al's Cycle Shop" in 204, where at least some of the instances may vary (e.g., be un-bolded) between the different representations. To identify which if these different instances "line up" between the different representations DOM objects and/or differences between DOM objects for the respective instances can be consulted, for example.

Returning to FIG. 1, at 106 of the exemplary method 100, non-intersecting elements in the respective first and second sets are ranked according to representation relevance, such as visual representation relevance, for example. In one embodiment, representation relevance can indicate how relevant a particular element is to the representation of the document. That is, for example, when transitioning between a full webpage representation of the document and a snippet representation of the document (e.g., as illustrated in FIG. 2), some elements may have higher relevance to a particular representation (e.g., may be more important or salient for the particular representation) than others, and therefore, can be ranked accordingly. Moreover, the relevance of a particular element may vary between representations. For example, a particular element may have a high relevance in a first representation, a low relevance in a second representation, but then a high relevance again in a third representation. In this manner, as a transition occurs between representations (e.g., from full webpage to snipped), a particular element may appear, disappear and then reappear, for example.

Further, in one embodiment, merely those elements, such as visual elements, that are not part of the intersection of the two sets of elements (e.g., not common to both sets) are ranked for the respective sets. For example, the first set of elements from the first representation comprises a subset of intersecting elements (e.g., common to the second set) and a subset of non-intersecting elements (e.g., not common to the second set). In this example, the second set will also have two subsets, intersecting and non-intersecting. In this embodiment, merely the elements in the subsets of non-intersecting elements are ranked by representation relevance.

It will be appreciated that representation relevance is not limited to any particular embodiment, and can be determined as a default measure or provided by a user or administrator. In one embodiment, the representation relevance may be determined empirically, through observation, such as by identifying what users prefer. For example, representation relevance can be determined by size and type of font, prominence of graphics, placement of text or graphics on the page, and other metrics that allow interpretation of relevance. Further, in one embodiment, representation relevance can be determined by a size of the representation. For example, the second representation 204 of FIG. 2 comprises a smaller bounding area than that of the first representation 202. In this example, those elements that are too large to fit inside this reduced bounding box may comprise a lower representation relevance. Further, in another embodiment, the relevance of the elements can be learned, for example, by observing user interaction patterns with the representations.

At 108, in the exemplary method 100 of FIG. 1, an iterative flow of the method can proceed while an intermediate representation of the document between the first and second representations is not equivalent to the second representation of the document (e.g., not a full page or snippet representation). In one embodiment, the exemplary method 100 provides for a transition from the first document to the second document, for example, and a display of a visual representation of the transition can be provided, such as by displaying various iterations of an intermediate representation of the document. Therefore, in this embodiment, while the transition has not reached the point of the second representation, the iteration over the intermediate representation is performed, for example.

At 110, first set non-intersecting elements are removed from the intermediate representation of the document, for those first set non-intersecting elements that meet a desired removal threshold for representation relevance ranking (e.g., are below a desired relevance value for the representation). In one embodiment, an initial intermediate representation can be set to be equivalent to the first representation (e.g., most/least granular). In this way, for example, the intermediate representation is changed iteratively during the transition, such as by removing and/or adding elements, until it is equivalent to the second representation of the document (e.g., least/most granular).

At 112, second set non-intersecting elements are added to the intermediate representation of the document, for those second set non-intersecting elements that meet a desired addition threshold for representation relevance ranking. For example, those elements from the second set that are not common to the first set are ranked, and those that meet an addition threshold of representation relevance (e.g., are above a desired relevance value for the representation) are added to the intermediate representation.

In this way, for example, with respective iterations the intermediate document becomes more visually representative of the second representation and less visually representative of the first representation. The intermediate representation is output, such as to a display, at 114. For example, the intermediate representation comprises a transitional representation between the first and second representations. Therefore, in this example, with respective iterations, a transitional representation can be displayed, where each output comprises fewer first set non-intersecting elements and more second set non-intersecting elements.

Having iteratively output the intermediate document until it is equivalent to the second representation of the document, the exemplary method 100 ends at 116.

Figure 3:
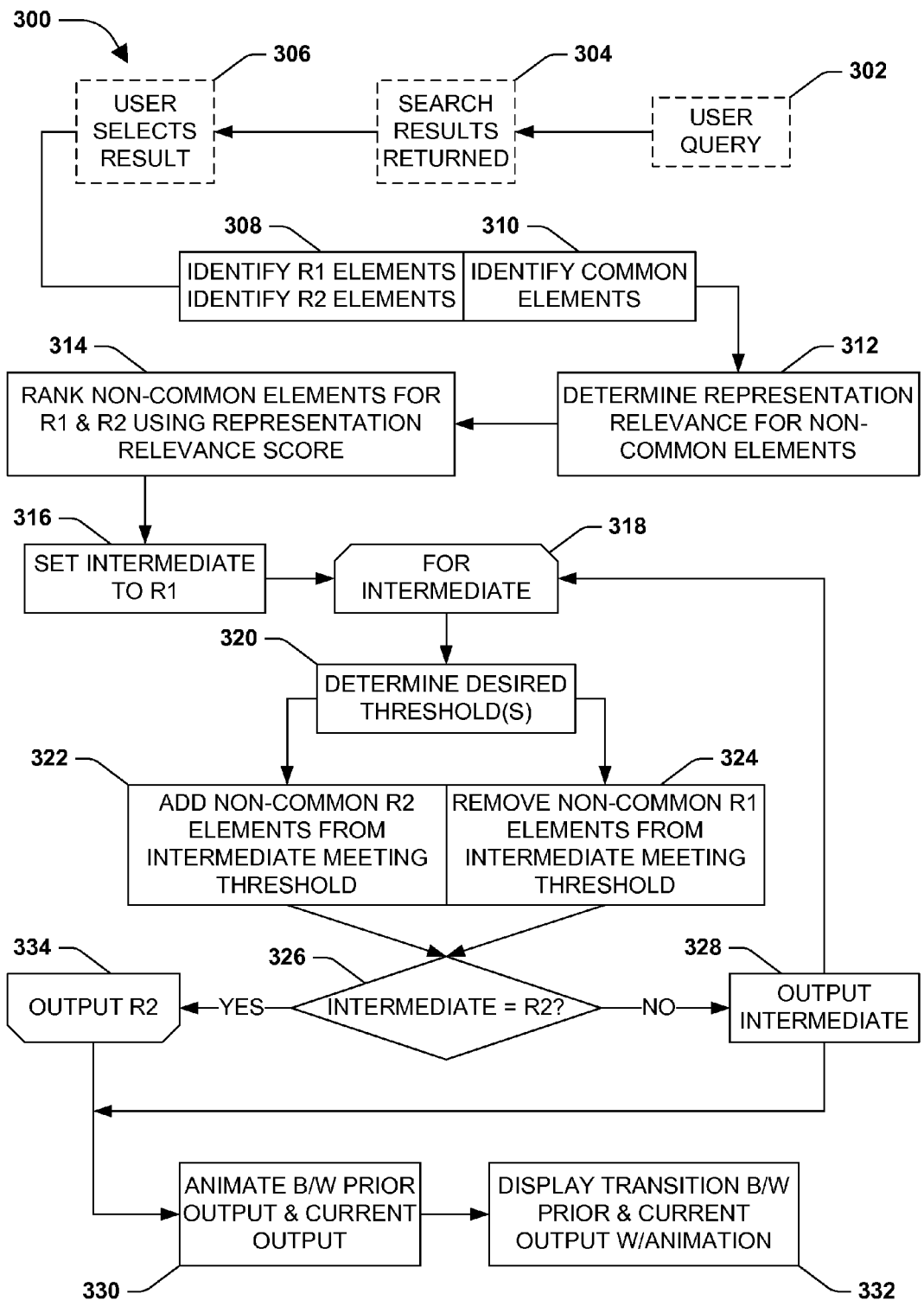
FIG. 3 is a flow diagram illustrating one embodiment where one or more portions of a method for transitioning between representations of an electronic document may be implemented.
Figure 4A:
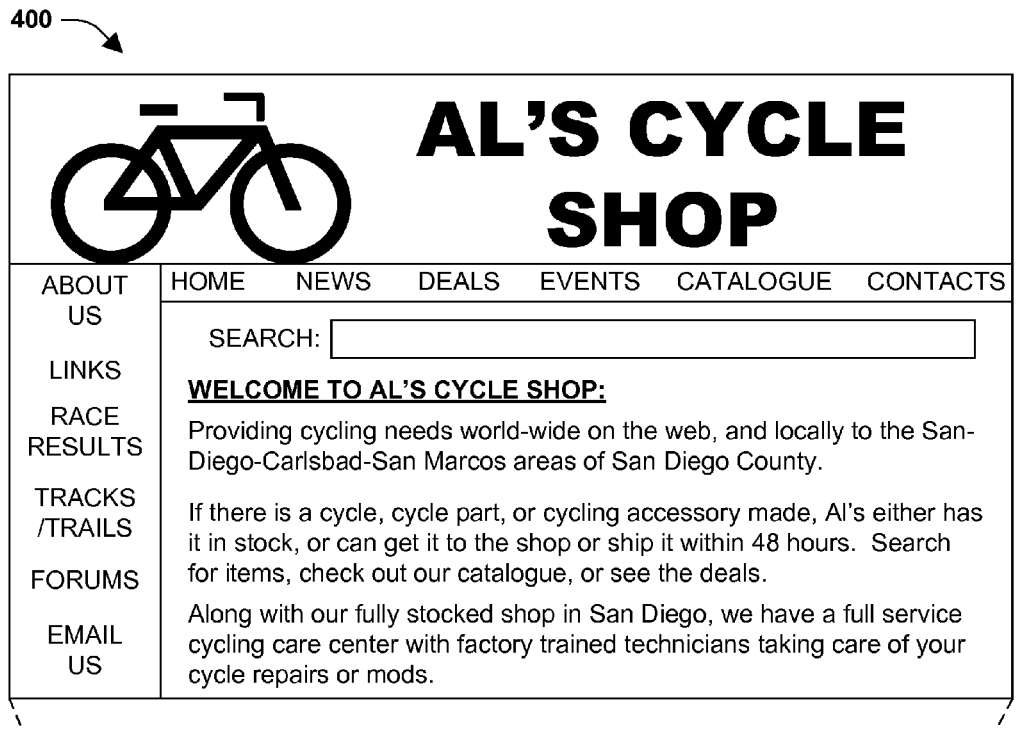

FIG. 3 is a flow diagram illustrating one embodiment 300 where one or more portions of a method for transitioning between representations of an electronic document may be implemented. FIG. 3 will, at times, be described below with reference to FIG. 2 and FIG. 4 for illustrative purposes. At 302, a user poses a query, such as to an online search service, and search results are returned, at 304. It will be appreciated that this example embodiment is merely using search results to illustrate the document representation transition, and is not intended to limit one or more of the techniques and/or systems described herein to merely this embodiment. Those skilled in the art may devise alternate embodiments for utilizing the document representation transition. For example, the transition may be used when opening a document from an icon or partial description on a desktop, or when closing or minimizing a document, for example.

At 306, in this embodiment 300, the user selects one of the returned search results. For example, commonly, online search providers represent results as snippets, as illustrated by 204 of FIG. 2, which show the user a small amount of information associated with a URL 252. In this example, the user can select the snippet 204, which comprises the first representation of the document (discussed above as the second representation), where the document comprises the webpage 202 for Al's Bike Shop, which comprises the second representation of the document (discussed above as the first representation). Therefore, for example, the transition comprises going from the first representation (the snippet 204) to the second representation (the full webpage 202). It will be appreciated that one or more of the aspects provided herein are likewise applicable to going from the full page back to the snippet, or from the second representation back to the first representation.

At 308 in the exemplary embodiment 300, elements (e.g., visual elements) from the first representation (snippet 204) and elements from the second representation (webpage 202) are identified. As described above, the elements for the first representation (snippet 204) may comprise a version of the top headline "Al's Cycle Shop," some text identifying the document as the "home page" 250, a smaller headline "Welcome To Al's Cycle Shop," a text block, and a URL for the webpage. The elements for the second representation (webpage 202) of the document may comprise three different graphics of cycles, a large top headline for "Al's Cycle Shop," a top navigation bar and a side navigation bar, a search box, a smaller headline "Welcome to Al's Cycle Shop," a text block, and a contact information block.

At 310, those elements that are common to both representations (e.g., intersecting elements of the first set and second set) are identified. For example, in this embodiment, the common elements between the first representation and the second representation can comprise the text of the top headline "Al's Cycle Shop"; the text of the smaller headline "Welcome to Al's Cycle Shop," and a portion of the text block "Welcome to Al's Bike Shop: Providing cycling needs world-wide on the web, and locally to the San-Diego-Carlsbad-San Marcos areas of." Therefore, in this example, the non-common elements between the representations (e.g., non-intersecting elements of the first set and second set) can comprise, for the first representation (snippet 204): text identifying the document as the "home page" 250, and the URL 252 for the webpage. The non-common elements for the second representation (webpage 202) can comprise: the three different graphics of cycles, the top navigation bar and the side navigation bar, the search box, some portions of the text block, and the contact information block. Additionally, for example, non-common elements may comprise text or graphics features, such as highlighting, bolding, underlining, frames, sizes, etc.

At 312, the non-common elements in the respective representations are ranked according to representation relevance. As described above, representation relevance is not limited to any particular embodiment. In one embodiment, representation relevance may comprise using relevance features, such as document features, document search features, global preferences, and user-related preferences. For example, document features can comprise font, style, location in document, etc., where text that is larger and/or bolded and/or placed first in the document may have a higher relevance than text that is smaller, and/or that appears later in the document, for example.

Further, as an example, document search features can comprise contextual features related to a task for the user, such as when a user searches (e.g., locally, remotely in storage, or online) for documents related to a particular task, the search terms found in the document that are the same as or similar to the searched task may have a higher relevance than other terms. Additionally, global preferences and user-related preferences can influence relevance, for example, where default settings (e.g., global) may be applied to give higher relevance to certain elements (e.g., logo of a favorite team), and/or users may apply personalized settings to give higher relevance to desired element types (e.g., images vs. text).

In one embodiment, representation relevance can be determined according to visual relevance of an element to the representation of the document. For example, a document feature may comprise a particularly prominent graphic (e.g., image) displayed at the top of the document. In this example, this graphic may be more visually relevant than a smaller graphic displayed at the bottom of the document. Further, representation relevance can be determined according to text matching relevance, related to the document search. For example, if particular query terms are identified in the document, those terms may have a higher relevance. Additionally, representation relevance can be determined according to contextual relevance to search related information. For example, a context for the search can be determined and terms, themes, and/or tags, etc., that are found in the document to match the search context can have a higher relevance.

In one embodiment, representation relevance can be determined using machine learning techniques to assign relevance. For example, user interaction patterns can be used to determine relevance. Elements of a representation that users interact with frequently may be assigned higher relevance, for example, while those interacted with less frequently may be assigned a lower relevance, for example. In one embodiment, user interactions can be detected by click-through events, or some other (e.g., page) events that identify user interaction, for example.

At 314 in the exemplary embodiment 300, the non-common elements for the first representation (snippet 204) are ranked according to a representation relevance score, and the non-common elements for the second representation (webpage 202) are ranked according to a representation relevance score. In one embodiment, the representation relevance can be determined and corresponding score can be assigned. For example, a score from zero to one hundred may be used, such as by adding scores for particular features, where those elements having more desired features of relevance may receive a higher score. The score for the elements is not limited to any particular embodiment, and those skilled in the art may devise alternate scoring techniques. For example, a score between one and ten may be applied, where an element having a score of one comprises a highest ranked element. It will be appreciated that relevance can be assigned not only to individual elements, but to sets of elements as well. For example, there may be some structure (e.g., determined by DOM structure(s) and/or visual convention(s)) to a representation that can be used to assign relevance to sets of elements.

In one embodiment, a rank can be pre-assigned to an element in a representation, which may be pre-set based on a desired visual representation. For example, a designer of the document may wish to have a particular feature prominently displayed in any representation of the document. In this example, the designer may assign a highest score or rank to the element so that it is featured in the first and second representations (e.g., and any intermediate representations).

In one embodiment, the element's rank can be pre-determined, such as by a default or global setting for a particular type of document (e.g., webpage), such as to promote display of the document's main heading, for example. Further, the element's rank can be determined dynamically (e.g., on-the-fly), for example, at a time the document is selected or retrieved. As an example, when a user performs a search (e.g., on a local machine or on a remote server) using query terms, a rank for elements that match the one or more of the query terms can be determined at the time the document representation is selected (e.g., clicked on by the user to open). In one embodiment, the element's rank can be learned using machine learning techniques, as described above, for example, where user interactions with elements, for example, can be used to determine ranking.

In another embodiment, one or more intersecting elements can also be ranked according to representation relevance. In this embodiment, one or more intersecting elements may or may not be included in one or more of the intermediate representations. For example, one or more common elements may be removed in order to create visually cohesive elements for purposes of smooth animation. In this embodiment, one or more intersecting elements can be ranked, and those that meet a desired threshold for a particular representation may be included in that particular intermediate representation, whereas those that do not meet a desired threshold for a particular representation may be omitted from that particular intermediate representation, for example.

Additionally, it will be appreciated that an element of a document is not limited to any particular embodiment, but is merely intended to describe some part (or group of parts) of a document. For example, a document can comprise some structure (e.g., determined by DOM structure(s) and/or by visual conventions(s)) to a representation. In one embodiment, the structure can comprise a set of parts (e.g., more than one element) to which relevance can be assigned.

At 316 in the exemplary embodiment 300, the intermediate representation is set to be equivalent to the first representation (snippet 204), as described above for this example. At 318, for respective intermediate representations, a desired addition threshold and/or a desired removal threshold can be determined, at 320. In one embodiment, a desired threshold may be determined dynamically for respective intermediate representations based on features of the intermediate representation. That is, for example, elements that may be relevant to a first intermediate representation may not be as relevant to a second intermediate representation. Further, in this example, elements that may not be as relevant to the first intermediate representation may be more relevant to a second intermediate representation. In this way, in this embodiment, the desired threshold can be adjusted according to a particular intermediate representation.

In one embodiment, the desired removal threshold, and/or the desired addition threshold can be set for a representation relevance ranking of the elements based on a physical display dimension for the intermediate representation of the document. For example, the first representation (snippet 204 has a smaller physical display dimension (e.g., a snippet size) than the second representation (e.g., a full webpage). Further, during a transition between the first and second representations of the document, for example, the intermediate representation(s) can comprise bigger (or smaller) transitional display dimension sizes.

Turning to FIGS. 4A-4D, example embodiments 400, 410, 420, 440 of intermediate representations of a document are illustrated. The representation 440 of FIG. 4D may comprise an intermediate representation between the first representation (snippet 204) and the second representation (webpage 202). As an example, the representation 440 comprises a larger display dimension than the first representation (snippet 204). In this example, the desired addition threshold may be set at a relevance score level that can include larger and/or more elements to fit inside the display dimension of the intermediate representation 440. It will be appreciated that one or more of FIGS. 4A-4D are referenced herein again for purposes of explanation.

Returning to FIG. 3, at 322, non-common elements from the second representation (webpage 202) are added to the intermediate representation (e.g., which is set as equivalent to the first representation (snippet 204) during the first iteration through the loop 318 to 324). As an example, in FIG. 4D, the intermediate representation comprises additional text from the text block, which is not common to the first representation (snippet 204), but is an element of the second representation (webpage 202). At 324, non-common elements from the first representation (snippet 204) are removed from the intermediate representation. For example, the underlining of "Al's Cycle Shop" is not common to the second representation (webpage 202), but is an element of the first representation (snippet 204) so this underlining is removed.

After adding elements from the second representation and removing elements from the first representation, at 326, if the intermediate representation is equivalent to the second representation (e.g., have completely transitioned from the snippet 204 to the full webpage 202), the loop ends at 334, where the second representation is output. However, at 326, if the intermediate representation is not equivalent to the second representation, the intermediate representation is output. For example, a first intermediate representation for a transition between the first representation (snippet 204) and the second representation (webpage 202) can comprise 440 of FIG. 4D.

At 318, for the intermediate representation, thresholds are determined, at 320, and non-common elements are added and/or removed from the intermediate representation, at 322 and 324, as described above. As an example, after outputting the first intermediate representation 440, a bolding and underlining of the text "WELCOME TO AL'S CYCLE SHOP" and a size increase of the top headline are added, and the URL and the text "Home Page" are removed from the first intermediate representation 440. In this example, a resulting second intermediate representation can comprise 420 of FIG. 4C. Because the second intermediate representation 420 is not equivalent to the second representation, at 326, the second intermediate representation is output at 328, and a next iteration occurs at 318.

Figure 4B:

A third intermediate representation may comprise 410 of FIG. 4B, for example. In this example, a search box and top navigation bar have been added, and no elements have been removed. If ranked elements of a representation do not meet a desired threshold, they may not be added or removed. In this example, none of the first representation elements met a desired removal threshold; therefore, none were removed from the second intermediate representation. A fourth intermediate representation can comprise 400 of FIG. 4A, for example. In this example, a side navigation bar and a top cycle graphic are added to the third intermediate representation.

A final intermediate representation may comprise the second representation, for example, where the remaining non-common elements from the second representation (webpage 202) are added to the fourth intermediate representation 400. At 326, because the fifth intermediate representation is equivalent to the second representation (webpage 202) of the document, the loop ends at 334 where the second representation is output.

In one embodiment, outputting the intermediate representation(s) of the document can comprise outputting intersecting elements and added non-intersecting elements. For example, the intermediate representations 400, 410, 420 and 440 comprise merely those visual elements that are common to both the first representation (snippet 204) and second representation (webpage 202), and non-common elements from the second representation (webpage 202) that have been added to the previous iteration of the intermediate document.

Further, in one embodiment, outputting the transition from a first visual representation of the document (e.g., snippet 204) to a second visual representation of the document (e.g., webpage 202) can occur where the first visual representation of the document comprises a subset of elements from the second visual representation's set of elements, such as where the snippet 204 merely comprises some of the elements of the webpage 202 (e.g. so that no non-common elements from the snippet 204 would have to be removed when transitioning up to the full webpage 204). Additionally, the transition from the first to the second representation may occur where the second visual representation of the document comprises a subset of elements from the first visual representation's set of elements.

In the exemplary embodiment 300, at 330, for respective intermediate representation outputs, animation is generated that comprises a transition between a prior output representation and a current output representation or a first visual representation of the document and a second visual representation of the document. That is, for example, animation can be created that provides a smooth visual transition between the intermediate representation previously output (e.g., intermediate representation 440 of FIG. 4D) and an intermediate representation currently output (e.g., intermediate representation 420 of FIG. 4C). At 332, the transition between the outputs (e.g., intermediate representations) can be displayed, such as on a computer display, with the generated animation.

In one embodiment, generating the animation for a transition between the first visual representation and the second visual representation can comprise generating common element animation. In this embodiment, common element animation can animate a transition between an intersecting element in the first visual representation and the second visual representation, where the intersecting element has a different representation in the different visual representations. For example, in the first intermediate representation 440 "AL'S CYCLE SHOP" is displayed in a small font, whereas it is displayed in a much larger font in the second intermediate representation 420. In this example, an animation can be created to display a smooth transition between the font sizes. For example, the text element of "Al's Cycle Shop" may be common between first and second representations, but the formatting elements (e.g., bolding, underlining, font size) may be unique to one representation or the other. Since the text element is common, merely the formatting elements may be ranked and added or removed as appropriate. For example, elements unique to a first representation of "Al's Cycle Shop" may comprise bold, underlined, all caps and font size 16, and elements unique to a second representation of "Al's Cycle Shop" may comprise title capitalization and font size 10. Accordingly, transitioning from the first representation to the second representation may comprise a first intermediate representation where the font size is reduced from 16 to 14, a second intermediate representation where bolding is removed, a third intermediate representation where the font size is reduced from 14 to 12, a fourth intermediate representation where underlining is removed, a fifth intermediate representation where the font size is reduced from 12 to 10, and a sixth intermediate representation where all caps is changed to title capitalization (e.g., capitalize merely first letters as opposed to all letters) to arrive at the second representation comprising the text "Al's Cycle Shop" with font size 10 and title capitalization. In one example, to reduce the font size, the font size may be represented as elements of the first representation {Font size+1, Font size+1, Font size+1}, such that respective reductions in font size may effected by iteratively implementing "Remove font size+1" operations.

In one embodiment, generating the animation for a transition between the first visual representation and the second visual representation can comprise generating non-common element animation that animates a removal and/or addition of a non-intersecting element between the first visual representation of the document and the second visual representation of the document. For example, the URL "www.alscycleshop.com" is removed between the first 440 and second 420 intermediate representations, and an animation can be generated that creates a smooth visual transition of the removal. Further, as an example, the search box is added between the second 420 and third 410 intermediate representations, and an animation can be generated that creates a smooth visual transition of the addition.

Figure 5:
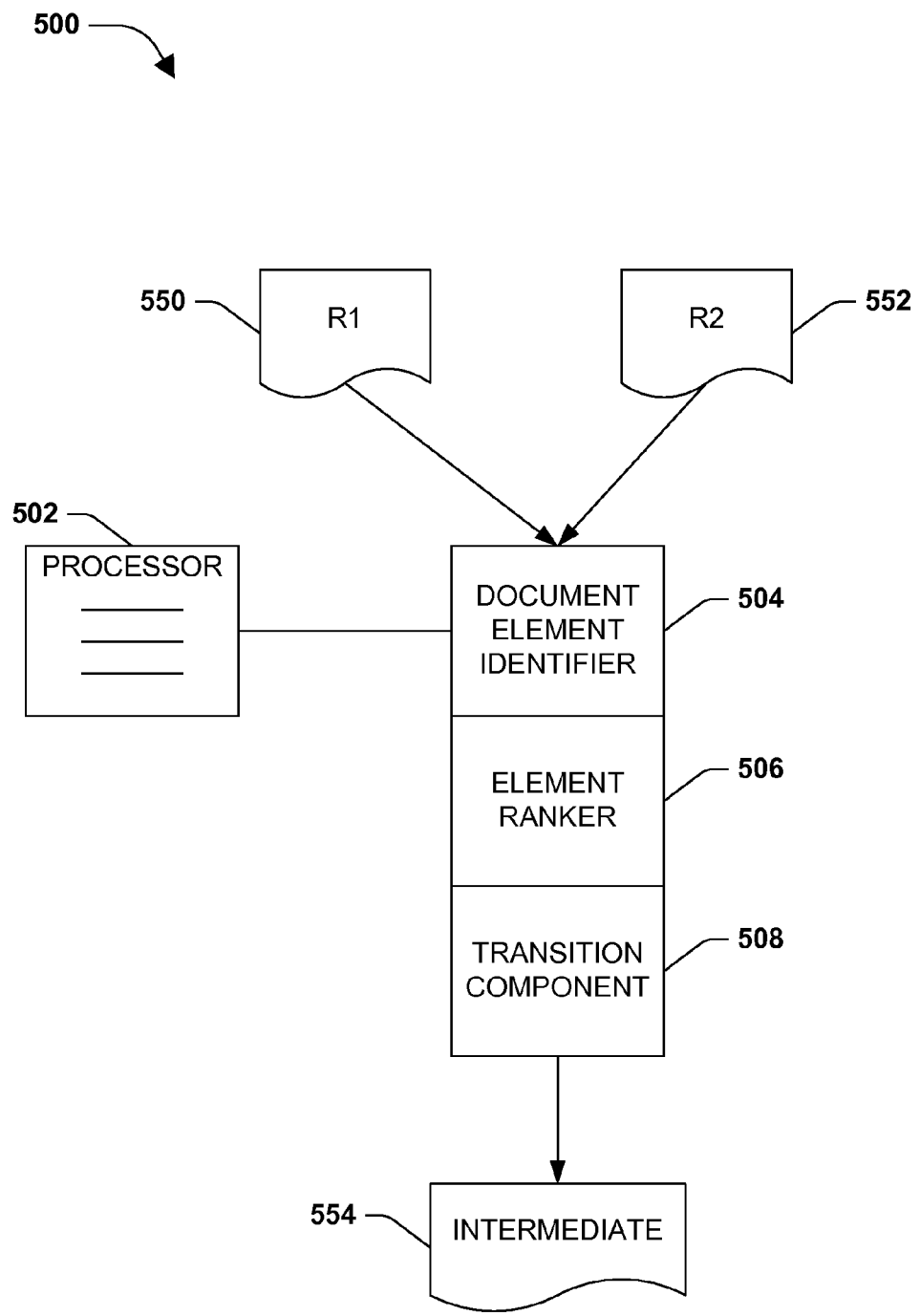
FIG. 5 is a component diagram of an exemplary system for transitioning between representations of an electronic document.

A system can be devised that may create a displayed transition between two different representations of a document. FIG. 5 is a component diagram of an exemplary system 500 for transitioning between representations of an electronic document. A processor 502, such as in a computing device, processes instructions for the system.

Operably coupled with the processor 502 is a document element identification component 504, which identifies elements that are common to both a first representation 550 of the document and a second representation 552 of the document (e.g., comprised in an intersection of a set of elements from the first representation and a set of elements from the second representation). An element ranking component 506 is operably coupled with the document element identification component 504 for ranking non-common elements from the first representation 550 of the document and non-common elements from the second representation 552 of the document. The element ranking component 506 ranks the elements according to a representation relevance function, for example, which can derive a relevance score for an element.

A transitioning component 508 is operably coupled with the element ranking component 506 and document element identification component 504. The transitioning component 508 generates a transition representation of the document between the first 550 and second 552 representations of the document, for example, generating a visual transition between the first and second representations. While an intermediate representation 554 of the document is not equivalent to the second representation 552 of the document, the transitioning component 508 removes non-common elements that are in the first representation 550 from the intermediate representation 554 that meet a desired removal threshold for representation relevance ranking.

Further, while an intermediate representation 554 of the document is not equivalent to the second representation 552 of the document, the transitioning component 508 adds non-common elements that are in the second representation 552 to the intermediate representation 554 that meet a desired addition threshold for representation relevance ranking. The intermediate representation 554 of the document is then output by the transitioning component 508.

Figure 6:
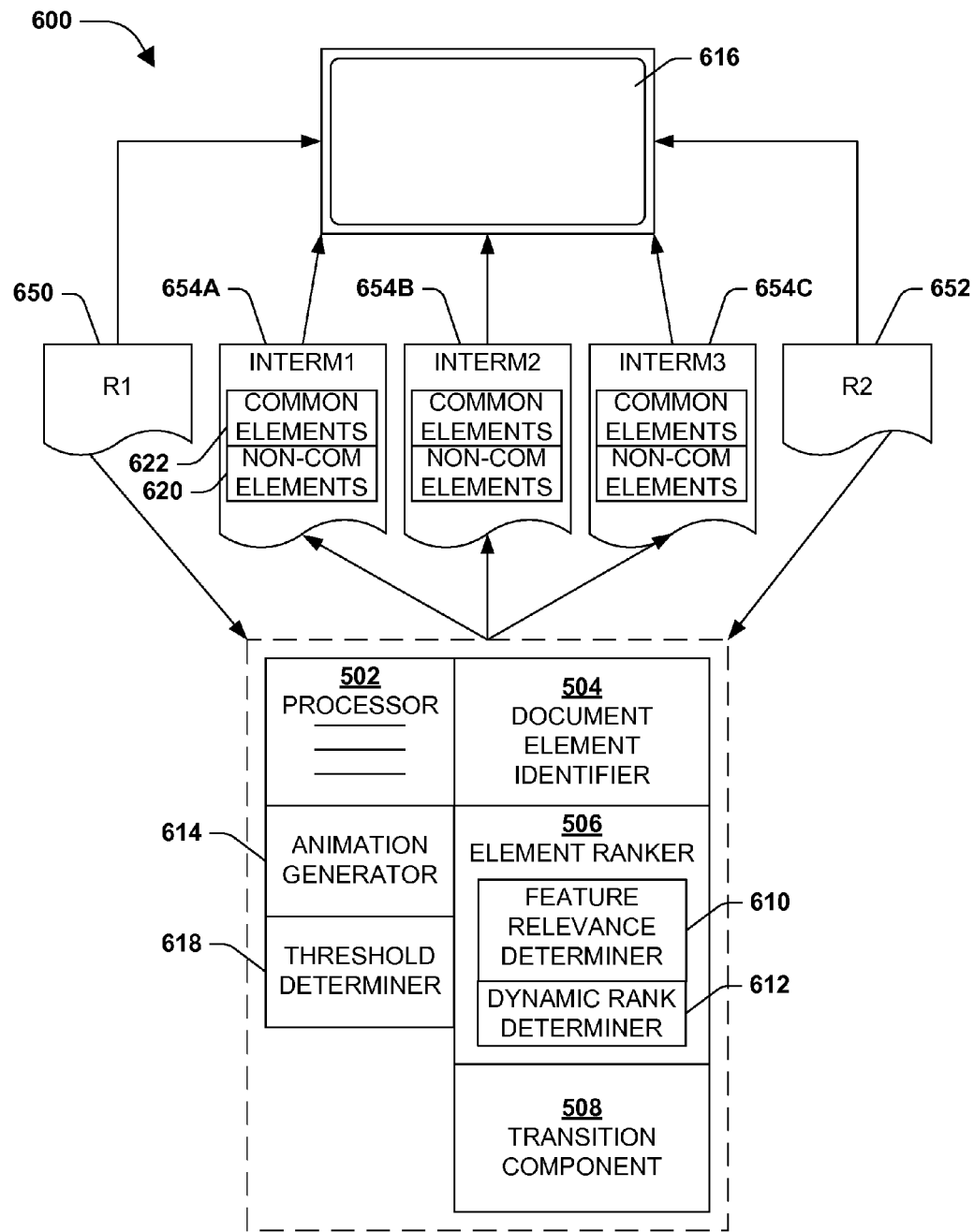
FIG. 6 is a component diagram illustrating one embodiment where one or more systems described herein are implemented.

FIG. 6 is a component diagram illustrating one embodiment 600 where one or more systems described herein are implemented. In this embodiment 600, an initial intermediate representation of the document comprises (e.g., can be set to) an equivalent of the first representation 650. Further, the intermediate representation(s) 654A, 654B, 654C of the document can comprise common elements 622 (e.g., common to both the first 650 and second 652 representations as may be identified by a document element identification component 504) and added non-common elements 620 (e.g., from the second representation 652).

An animation generation component 614 is configured to generate animation that comprises a transition between a first visual representation of the document (e.g., intermediate representation one 654A) and a second visual representation of the document (e.g., intermediate representation two 654B). In this embodiment, the animation can comprise a common element animation that animates a transition between a common element in the two visual representations. In this embodiment, the common element can have a different representation in the second visual representation of the document than it does in the first visual representation of the document.

Further, the animation can comprise a non-common element animation, where the non-common element animation may be animation of a removal of a non-common element between the first visual representation of the document and the second visual representation of the document. The non-common element animation may also be an animation of an addition of a non-common element between the first visual representation of the document and the second visual representation of the document.

A threshold determination component 618 is configured to identify a desired removal threshold and/or a desired addition threshold. The identification of a desired threshold can be based on a physical display dimension for the intermediate representation of the document (e.g., a size of the document representation on a display). Further, the identification of a desired threshold can be based on a contextual relevance for the representation of the document, such as how relevant particular elements may be to the intermediate representation at a time of output (e.g., based on document features and/or search features), for example.

The element ranking component 506 comprises a feature relevance determination component 610 that provides ranking information. In one embodiment, the ranking information may comprise and/or be based on visual relevance to the representation of the document (e.g., a desired design); text matching relevance to a document search (e.g., if a query term matches text in the representation); and/or contextual relevance to search related information (e.g., based on a theme of a search). Further, the ranking information for the feature relevance determination component 610 may be applied to document features (e.g., text or graphics); document search features (e.g., query terms); global preferences (e.g., default settings); and/or user-related preferences (e.g., user setting).

The element ranking component 506 further comprises a dynamic rank determination component 612 that can dynamically determine an element rank for an element based on contextual relevance of the element at a time of transition between representations of the document. For example, a search query may comprise particular terms and/or themes that are merely relevant to one or more of the documents returned by the search. In this example, a rank for an element in a selected document representation can be determined dynamically based on the search terms or themes, for example.

A display device 616 can receive the output intermediate representation 654A-654C of the document to provide a transition between the first 650 and second 652 representations of the document. That is, for example, the exemplary embodiment of the system 600 can output the first representation 650 to the display 616, and further display an animated transition to the second representation 652, comprising the intermediate representations 654A-654C. As an example, the display device 616 can comprise a computer monitor, or any other component or device configured to display computer-based graphical content.

Figure 7:
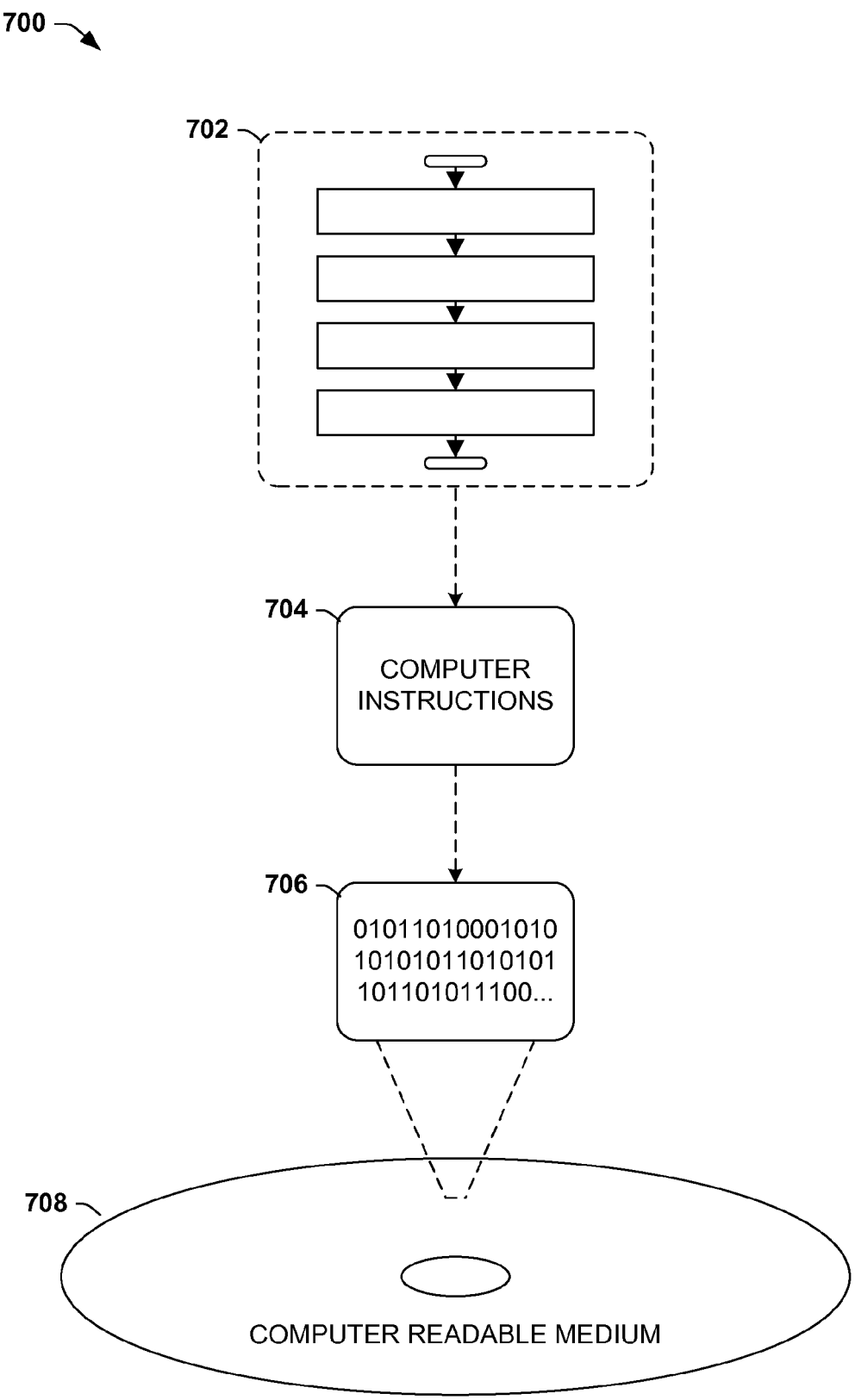
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as the exemplary method 100 of FIG. 1, for example. In another such embodiment, the processor-executable instructions 704 may be configured to implement a system, such as the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
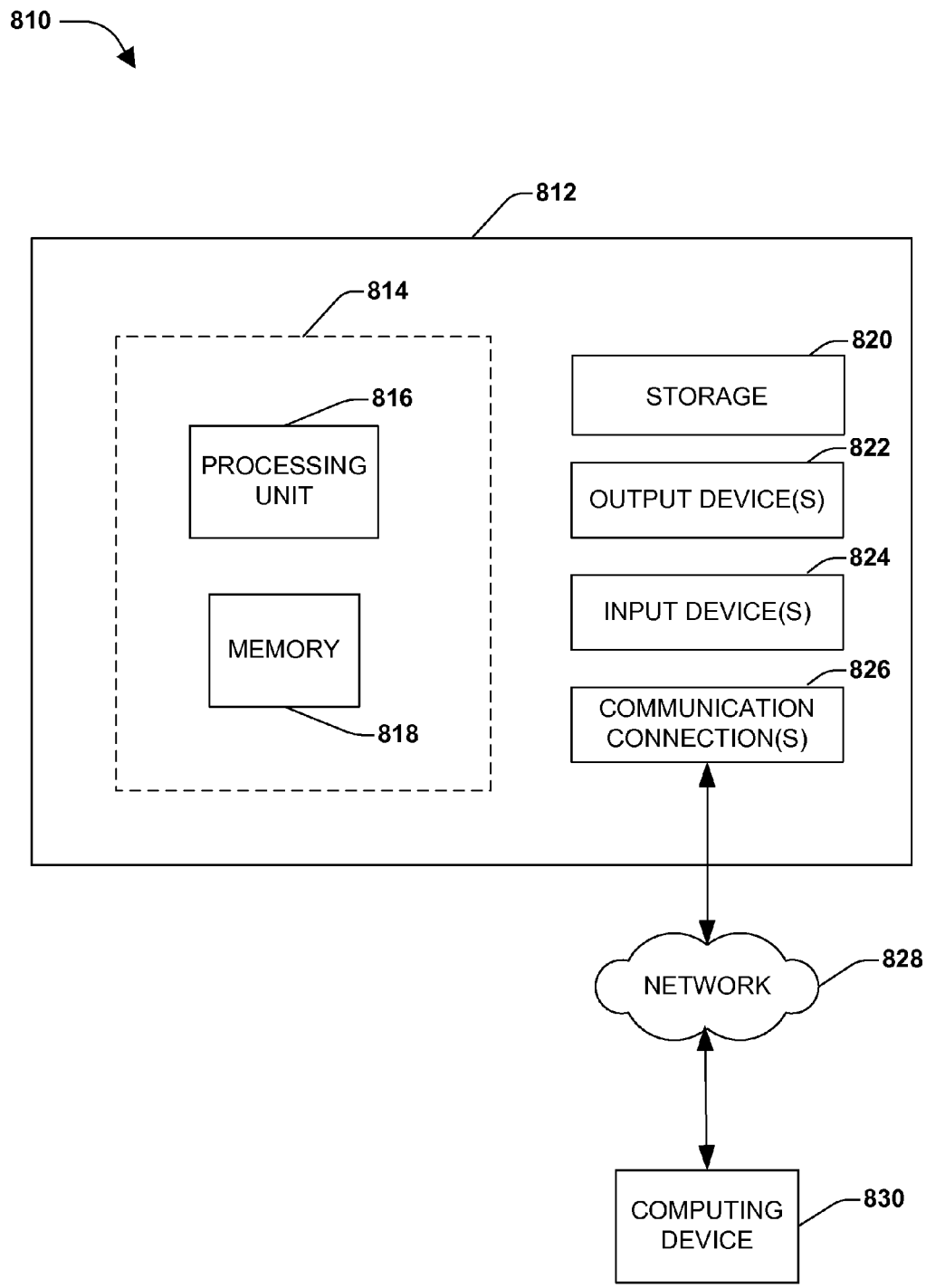
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for transitioning between representations of an electronic document, comprising:
   performing a search using a search engine;
   identifying an intersection of elements between a first set of elements from a first representation of the electronic document and a second set of elements from a second representation of the electronic document;
   ranking non-intersecting elements in the first set based upon relevance of at least some of the non-intersecting elements in the first set to the search;
   ranking non-intersecting elements in the second set based upon relevance of at least some of the non-intersecting elements in the second set to the search; and
   while an intermediate representation of the electronic document between the first representation and the second representation is not equivalent to the second representation:
      removing at least some non-intersecting elements of the first set from the intermediate representation of the electronic document that meet a desired removal threshold based upon the ranking of the non-intersecting elements in the first set;
      adding at least some non-intersecting elements of the second set to the intermediate representation of the electronic document that meet a desired addition threshold based upon the ranking of the non-intersecting elements in the second set; and
      outputting the intermediate representation of the electronic document after the removing and the adding.

2. The method of claim 1, comprising setting an initial intermediate representation of the electronic document as equivalent to the first representation.

3. The method of claim 1, comprising generating animation that comprises a transition between a first visual representation of the electronic document and a second visual representation of the electronic document.

4. The method of claim 3, generating animation that comprises a transition between the first visual representation of the electronic document and the second visual representation of the electronic document comprising one or more of:
   generating common element animation that animates a transition between an intersecting element in the first visual representation of the electronic document and the second visual representation of the electronic document, where the intersecting element comprises a different representation in the second visual representation of the electronic document than in the first visual representation of the electronic document; or
   generating non-common element animation that animates one or more of:
      a removal of a non-intersecting element between the first visual representation of the electronic document and the second visual representation of the electronic document; or
      an addition of a non-intersecting element between the first visual representation of the electronic document and the second visual representation of the electronic document.

5. The method of claim 1, at least one of ranking non-intersecting elements in the first set or ranking non-intersecting elements in the second set comprising ranking based upon one or more of:
   electronic document features;
   electronic document search features;
   global preferences;
   learned preferences; or
   user-related preferences.

6. The method of claim 1, at least one of ranking non-intersecting elements in the first set or ranking non-intersecting elements in the second set comprising ranking based upon visual relevance to a representation of the electronic document.

7. The method of claim 1, comprising pre-assigning a rank to an element in a representation set based upon a desired visual representation.

8. The method of claim 1, at least one of ranking non-intersecting elements in the first set or ranking non-intersecting elements in the second set comprising one or more of:
pre-determining an element rank for a non-intersecting element; or
dynamically determining the element rank for the non-intersecting element.

9. The method of claim 1, comprising setting at least one of the desired removal threshold or the desired addition threshold based upon a physical display dimension for the intermediate representation of the electronic document after the outputting.

10. The method of claim 1, outputting the intermediate representation of the electronic document comprising outputting intersecting elements and added non-intersecting elements.

11. The method of claim 1, outputting the intermediate representation of the electronic document comprising one of:
outputting a transition from a first visual representation of the electronic document to a second visual representation of the electronic document, the first visual representation of the electronic document comprising a subset of elements from a set of elements of the second visual representation; or
outputting a transition from a first visual representation of the electronic document to a second visual representation of the electronic document, the second visual representation of the electronic document comprising a subset of elements from a set of elements of the first visual representation.

12. A system for transitioning between representations of a webpage, comprising:
one or more hardware processing units; and
memory comprising instructions that when executed via at least one of the one or more processing units implement at least some of:
a document element identification component configured to identify elements that are common to both a first representation of the webpage and a second representation of the webpage;
an element ranking component configured to:
rank non-common elements from the first representation of the webpage based upon relevance of at least some of the non-common elements from the first representation of the webpage to a search performed using a search engine; and
rank non-common elements from the second representation of the webpage based upon relevance of at least some of the non-common elements from the second representation of the webpage to the search; and
a transitioning component configured to generate an intermediate representation of the webpage between the first representation of the webpage and the second representation of the webpage, the generating comprising, while the intermediate representation of the webpage is not equivalent to the second representation of the webpage:
removing at least some non-common elements that are in the first representation of the webpage from the intermediate representation of the webpage that meet a desired removal threshold based upon the rank of the non-common elements of the first representation;
adding at least some non-common elements that are in the second representation of the webpage to the intermediate representation of the webpage that meet a desired addition threshold based upon the rank of the non-common elements of the second representation; and
outputting the intermediate representation of the webpage after the removing and the adding.

13. The system of claim 12, an initial intermediate representation of the webpage comprising an equivalent of the first representation.

14. The system of claim 12, the intermediate representation of the webpage after the removing and the adding comprising common elements and added non-common elements.

15. The system of claim 12, comprising an animation generation component configured to generate animation that comprises a transition between a first visual representation of the webpage and a second visual representation of the webpage, the animation comprising one or more of:
a common element animation that animates a transition between a common element, where the common element comprises a different representation in the second visual representation of the webpage than in the first visual representation of the webpage; or
a non-common element animation comprising one or more of:
an animation of a removal of a non-common element between the first visual representation of the webpage and the second visual representation of the webpage; or
an animation of an addition of a non-common element between the first visual representation of the webpage and the second visual representation of the webpage.

16. The system of claim 12, comprising a threshold determination component configured to identify at least one of the desired removal threshold or the desired addition threshold based upon:
a physical display dimension for the intermediate representation of the webpage after the outputting.

17. The system of claim 12, the element ranking component configured to rank based upon one or more of:
visual relevance;
text matching relevance; or
contextual relevance.

18. The system of claim 12, the element ranking component comprising a dynamic rank determination component configured to dynamically rank an element.

19. The system of claim 12, comprising a display device configured to at least one of:
receive and display the intermediate representation of the webpage after the removing and the adding, or
display a transition between a first visual representation of the webpage and a second visual representation of the webpage.

20. A computer readable hardware memory comprising instructions that when executed perform a method for transitioning between representations of a search result, the method comprising:
performing a search using a search engine;
identifying an intersection of elements between a first set of elements from a first representation of the search result and a second set of elements from a second representation of the search result;

ranking non-intersecting elements in the first set based upon relevance of at least some of the non-intersecting elements in the first set to the search;

ranking non-intersecting elements in the second set based upon relevance of at least some of the non-intersecting elements in the second set to the search; and while an intermediate representation of the search result between the first representation and the second representation is not equivalent to the second representation of the search result:

removing at least some non-intersecting elements in the first set from the intermediate representation of the search result that meet a desired removal threshold based upon the ranking of the non-intersecting elements in the first set;

adding at least some non-intersecting elements in the second set to the intermediate representation of the search result that meet a desired addition threshold based upon the ranking of the non-intersecting elements in the second set; and outputting the intermediate representation of the search result after the removing and the adding.

* * * * *